United States Patent [19]

Baranowski et al.

[11] 4,300,191

[45] Nov. 10, 1981

[54] PULSE WIDTH MODULATED CURRENT FED INVERTER POWER SUPPLY

[75] Inventors: Conrad J. Baranowski, Westford; Joel T. Bedell, Chelmsford, both of Mass.

[73] Assignee: Powercube Corporation, Billerica, Mass.

[21] Appl. No.: 117,208

[22] Filed: Jan. 31, 1980

[51] Int. Cl.³ .............................................. H02P 13/22
[52] U.S. Cl. ........................................ 363/17; 363/21; 363/26
[58] Field of Search .................. 363/17, 19, 21, 23–28

[56] References Cited

U.S. PATENT DOCUMENTS

| | | | |
|---|---|---|---|
| 3,663,940 | 5/1972 | Schwarz | 363/26 |
| 3,846,691 | 11/1974 | Higgins | 363/25 |
| 4,176,392 | 11/1979 | Cronin et al. | 363/26 |

FOREIGN PATENT DOCUMENTS 2544006  4/1977  Fed. Rep. of Germany ........ 363/25

*Primary Examiner*—William H. Beha, Jr.
*Attorney, Agent, or Firm*—James E. Mrose

[57] ABSTRACT

A fixed frequency pulse width modulated current fed inverter power supply with imbalance compensation provided by means of a primary inductor in the input circuit. Energy is coupled between the primary inductor in the input and secondary inductor windings in the output circuits to provide a balanced power supply with good efficiency.

3 Claims, 5 Drawing Figures

PULSE WIDTH MODULATED CURRENT FED INVERTER POWER SUPPLY

FIELD OF THE INVENTION

This invention relates generally to power supplies, and more particularly concerns a pulse width modulated inverter with a current fed input with flyback for a continuous output during both the forward conducting and dead time intervals.

DISCUSSION OF THE PRIOR ART

Fixed frequency parallel inverters have long been used as the input circuit of power supplies. Inherently there is an imbalance in the main transformer of such an inverter because of different switching times or saturation drop of the inverter transistors. In order to accommodate this imbalance situation, it has been a common practice to design the main transformer for a small percentage of available flux swing, and use switching transistors which have large current capability. Alternatively, carefully matched transistors could be employed, but this possible solution to the balance problem is relatively expensive and is not satisfactory for production quantity power supplies.

More specifically, pulse width modulated inverters have other inherent disadvantages. They often require a soft start to prevent core saturation. A condition which may be referred to as flux walking is created by the imbalance in storage times and the value of saturation voltages. The dead time has a minimum width limitation in order to prevent a shorted condition from occurring. Additionally, when the power supply has multiple outputs, loss of regulation can occur when the closed loop output is lightly loaded, resulting in the other outputs dropping out of regulation. In conventional parallel inverters, if a transistor or rectifier opened, the circuit would burn out due to transformer saturation.

SUMMARY OF THE INVENTION

The present invention provides a parallel inverter power supply with multiple outputs without the disadvantages of conventional inverters.

The input side of the power supply uses a center tapped power transformer primary with switching transistors each having a Zener diode clamp. An inductor primary winding is connected between the input voltage supply and the power transformer. The output circuits have a diode and a secondary winding of the inductor connected across the full wave rectifier. Conventional filtering and voltage divider means are provided in the outputs.

By employing an inductor primary winding in the input, the circuit is constructed as a current fed inverter. The secondary windings of the inductor are in the output circuits to provide flyback current during the dead time. By this means, there are lower core losses in the transformer, a soft start is not necessary, flux walking does not occur and energy stored in the inductor primary during forward conduction is released during the dead time interval to provide continuous output. The switching transistors need not have special characteristics nor need they be matched. Because of the coupled inductor, the circuit has good regulation when the load on any individual output circuit is reduced. An opened transistor or rectifier only results in reduced output but no damage to the circuit components.

BRIEF DESCRIPTION OF THE DRAWING

The objects, features and advantages of this invention will be more easily appreciated from the following detailed description when read in conjunction with the accompanying drawing in which.

DESCRIPTION OF THE PREFERRED EMBODIMENTS

Figure 1:
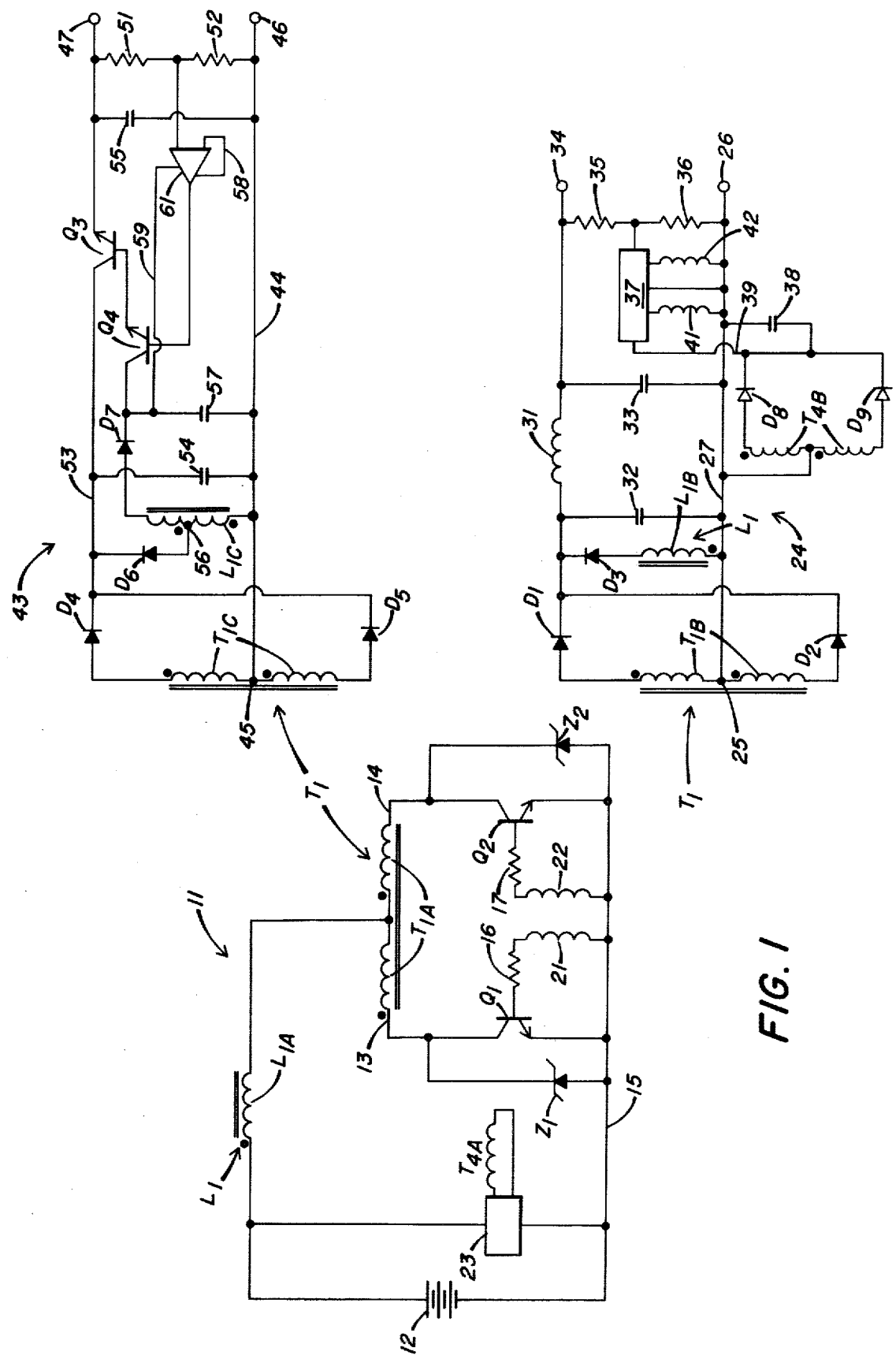
FIG. 1 is a schematic representation of the power supply of this invention.

With reference now to the drawing and more particularly to FIG. 1 thereof, there is shown a power supply constructed in accordance with the principles of the present invention. The input of the power supply comprises a parallel inverter 11 with input DC voltage source 12 connected to the primary winding $T_{1A}$ of transformer $T_1$ through the primary winding $L_{1A}$ of inductor $L_1$. Side 13 of winding $T_{1A}$ is connected to the collector of transistor $Q_1$ and to Zener diode $Z_1$, while side 14 of winding $T_{1A}$ is connected to the collector of transistor $Q_2$ and to Zener diode $Z_2$. The emitters of both transistors, and the other side of both Zeners are connected to the other side of voltage source 12 by means of common conductor 15. The base drive for transistors $Q_1$ and $Q_2$ is provided by signals coupled to resistors 16 and 17 by means of windings 21 and 22 respectively. Connected across voltage source 12 is a low power inverter circuit 23 employed to develop a bias voltage supply, the use of which will be explained hereinbelow.

Main channel output circuit 24 is coupled to the inverter circuit by means of the secondary winding $T_{1B}$ of transformer $T_1$. Diodes $D_1$ and $D_2$ are connected across winding $T_{1B}$ to provide a full wave rectified input to the main channel. Winding $T_{1B}$ has a center tap 25 connected to one output terminal 26 by means of conductor 27. The main channel filtering circuit comprises inductor 31 and capacitors 32 and 33 connected between the output terminals 34 and 26. Resistors 35 and 36 provide the conventional voltage divider across output terminals 34 and 26. Element 37 is a pulse width modulated integrated circuit (IC) chip which provides base drive to transistors $Q_1$ and $Q_2$ through windings 41 and 42 coupled by transformer action to windings 21 and 22, respectively, in the inverter. IC 37 is provided with an isolated bias voltage from winding $T_{4A}$ of inverter circuit 23 coupled to winding $T_{4B}$ in main output channel 24. With diodes $D_8$ and $D_9$ and capacitor 38, a full wave rectified bias voltage is applied to IC 37 through conductor 39. IC 37 may be referred to as a control circuit in that it controls the conduction intervals of transistors $Q_1$ and $Q_2$ which in turn control the entire pulsed or AC cycles of the power supply, both as to time of conduction and as to duration.

Connected across the rectified output of secondary winding $T_{1B}$ is the series flyback circuit comprised of the secondary winding of inductor $L_1$ (winding $L_{1B}$) and diode $D_3$. It may be appreciated that main output channel 24 is coupled to inverter 11 both by means of transformer $T_1$ and inductor $L_1$. The operation of this output channel will be described in detail later.

This power supply may have multiple outputs, although the invention is operative with only one output channel. In FIG. 1 there is shown one auxiliary output channel 43 coupled to inverter 11 by means of secondary winding $T_{1C}$ of transformer $T_1$ which has diodes $D_4$ and $D_5$ connected across the winding to provide full wave rectification. Conductor 44 is connected between center tap 45 of winding $T_{1C}$ and output terminal 46. Across output terminals 46 and 47 are voltage divider resistors 51 and 52. Transistor $Q_3$ is a series pass element in the auxiliary output, its collector being connected to diode $D_4$ by means of conductor 53 and its emitter being connected to output terminal 47. Conventional filter capacitors 54 and 55 are connected between common conductor 44 and the collector and emitter respectively of transistor $Q_3$. The flyback circuit in this output channel comprises winding $L_{1C}$ and diode $D_6$. However, diode $D_6$ is connected to a tap 56 on winding $L_{1C}$ rather than at the end thereof. The end of winding $L_{1C}$ is connected through diode $D_7$ to the collector of transistor $Q_4$ which provides base drive for transistor $Q_3$ by connecting the emitter of $Q_4$ to the base terminal of $Q_3$. Capacitor 57 is connected between the collector of transistor $Q_4$ and conductor 44. The base drive for transistor $Q_4$ is provided by voltage regulator 61. The voltage regulator senses the voltage at the voltage divider comprised of resistors 51 and 52. Conductor 58 represents an internal feedback loop in voltage regulator 61 to provide a precision voltage reference for auxiliary output channel 43. Bias voltage for regulator 61 is provided by conductor 59 connected from capacitor 57.

Operation of the power supply will now be discussed in detail. Parallel inverter circuit 11 is made a current fed inverter by means of inductor $L_1$ connected between the center tap of transformer primary winding $T_{1A}$ and voltage source 12. By this means the voltage across transformer winding $T_{1A}$ remains constant and any voltage variations occurring in the circuit appear across inductor winding $L_{1A}$. By controlling the conduction times and durations of switching transistors $Q_1$ and $Q_2$, and AC waveform is developed by the inverter, such control being accomplished by IC 37. It is inherent in a pulse width modulated fixed frequency inverter that there are dead times between two adjacent conducting times of the switching transistors. This is necessary to prevent the transistors from conducting simultaneously which would result in increased current through the primary winding $T_{1A}$ of the transformer and possible damage to it and to the transistors themselves. Zener diodes $Z_1$ and $Z_2$ act as clamps which limit the switching spikes to transistors $Q_1$ and $Q_2$.

During normal operation, much of the energy from the inverter is transferred to the main output channel through transformer $T_1$ and diodes $D_1$ and $D_2$ during the positive conduction times of switching transistors $Q_1$ and $Q_2$. In fixed frequency voltage fed inverters there would be no energy transfer during the dead times. However, in this circuit, inductor $L_1$ transfers energy to the main output channel through winding $L_{1B}$ and diode $D_3$. This is because inductor $L_1$ behaves in normal fashion and resists a change in current flow. When both switching transistors are off, there is no current in the main power portion of the inverter, that is, through the transistors and transformer $T_1$. The inductor acts to maintain the current during the dead time intervals and is allowed to do so by dissipating at least part of the energy of its collapsing magnetic field through secondary $L_{1B}$ in the output channel. Energy is transferred to winding $L_{1B}$ during this otherwise dead time so that the output to the load from terminals 34 and 26 is maintained.

It is thus apparent where the term flyback originates. The inductor $L_1$ not only simplifies the design of transformer $T_1$ by maintaining the voltage constant across its windings, it provides means to maintain the output at desired levels thereby substantially increasing power supply efficiency.

The auxiliary output channel functions in a similar manner with respect to flyback operation, but it has added advantages relating to regulation. In order to prevent the auxiliary channel from dropping out of regulation when the load on the main channel is relatively small, the flyback circuit was modified and other adjustments were made, compared with the main channel configuration.

Figure 5:
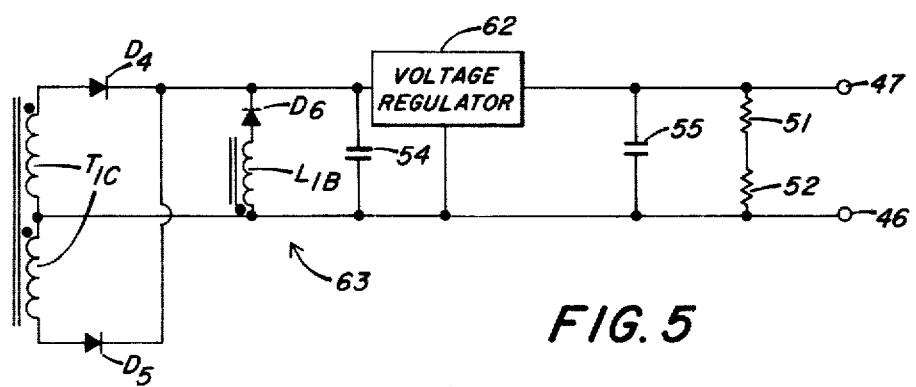
FIG. 5 is an alternative embodiment of the auxiliary output circuit.

For reference purposes, FIG. 5 shows an auxiliary output circuit 63 constructed substantially the same as the main output channel. Since it is basically circuit 43 of FIG. 1 with modifications related only to voltage regulation, equivalent elements have been given the same numbers in FIG. 5 as in FIG. 1. It will be apparent that winding $L_{1C}$ is not tapped, transistors $Q_3$ and $Q_4$, voltage regulator 61, diode $D_7$ and capacitors 54 and 57 have been removed, all of which have been effectively replaced by voltage regulator 62. This is a typical voltage regulator which requires a three volt differential between the input and the output of channel 63. Assuming an output of 12 volts and an input from winding $T_{1C}$ of 15 volts, the output channel will be properly regulated with this configuration. However, when the load on main channel 24 is substantially reduced, the power requirements from the inverter are also reduced. Control IC 37 will require only short conducting periods for switching transistors $Q_1$ and $Q_2$. With reduced load, the forward voltage of diodes $D_1$ and $D_2$ will be lower and there may be somewhat less voltage drop across the windings of transformer $T_1$. If this occurs, the secondary voltage on winding $T_{1C}$ will drop and there is likely to be less than a three-volt differential across voltage regulator 62, allowing auxiliary output circuit 63 to drop out of regulation. Thus this output will operate satisfactorily under typical conditions of substantial load on main output channel 24, but not when the main channel is operating substantially below full load, such as at a 10% load condition. For this reason the auxiliary output channel was constructed as shown in FIG. 1.

Like output circuit 24, auxiliary output circuit 43 derives most of its energy, under typical conditions, from the inverter through secondary winding $T_{1C}$ of transformer $T_1$. Flyback during the dead time provides energy through winding $L_{1C}$ and diode $D_6$. It would normally be expected that the turns ratio of the inductor $L_1$ be the same as transformer $T_1$. However, if the turns of winding $L_{1C}$ were greater than normal electrical principles would dictate, the voltage across the output terminals 46 and 47 could be maintained at the specified level even when the load on the main channel is reduced to as little as 10% of full load. In order to maintain a constant voltage of approximately three volts above the output, an intermediate tap 56 was applied to winding $L_{1C}$. The number of turns of $L_{1C}$ from the tap 56 to conductor 44 provides the same ratio to $L_{1A}$ as the ratio of $T_{1C}$ to $T_{1A}$. The additional turns are connected to the collector of transistor $Q_4$ through diode $D_7$, which, together with transistor $Q_3$ and voltage regulator 61, comprise the regulation circuit of output channel 43. Voltage regulator 61 provides the relatively small signal base drive for transistor $Q_4$ and the collector/emitter circuit of that transistor, fed by the full length of winding $L_{1C}$, provides the base drive for transistor $Q_3$.

Under normal full, or at least substantial, load on the main channel, auxiliary output 43 will be regulated in a manner similar to the circuit of FIG. 5. Voltage regulator 61 drives transistor $Q_4$ sufficiently for current to flow through diode $D_7$ and the collector/emitter junction of that transistor, thereby providing the base drive for transistor $Q_3$. Most of the load current then flows through the collector/emitter junction of transistor $Q_3$. When the main channel operates under substantially reduced load, reducing the power requirements on inverter 11, the full length of winding $L_{1C}$ is effectively switched in to maintain regulation of output channel 43. This is accomplished by increased base drive on transistor $Q_4$ as a reaction of voltage regulator to reduced voltage at the output voltage divider. By driving $Q_4$ harder, the bulk of the load current then flows through the collector/emitter junction thereof and through the base/emitter junction of transistor $Q_3$. Thus even when the main channel is operating under a light load which could be expected to reduce the voltage on the auxiliary channel, the additional turns on winding $L_{1C}$ and the associated transistors and voltage regulator 61 will maintain full output at terminals 46 and 47. By pulling more current than would otherwise be expected in the auxiliary flyback winding $L_{1C}$, energy is taken away from the main channel during the flyback portion of the cycle. As a result, more energy must be supplied during forward conduction, thereby preventing forward conduction time from being reduced below the level which would allow the auxiliary channel to drop out of regulation.

Figure 2:
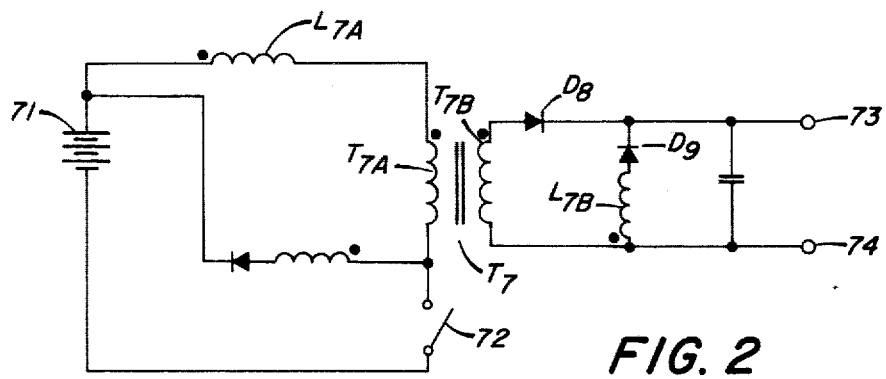
FIG. 2 is a simplified schematic of an alternative embodiment of the invention, constructed in the form of a forward inverter.
Figure 3:
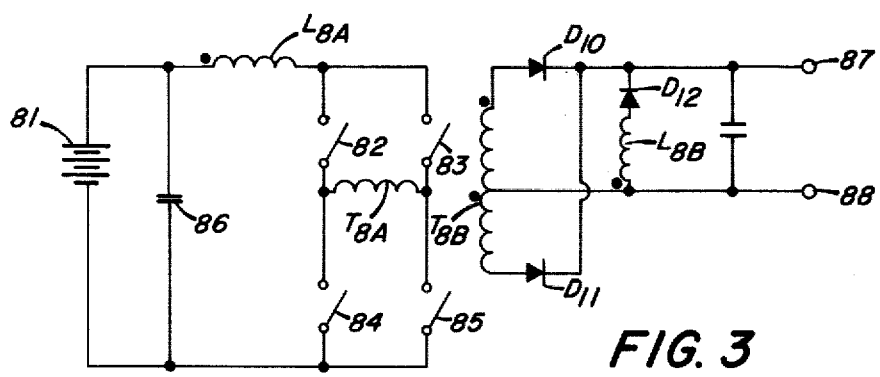
FIG. 3 is a simplified schematic of another alternative embodiment showing a full bridge.
Figure 4:
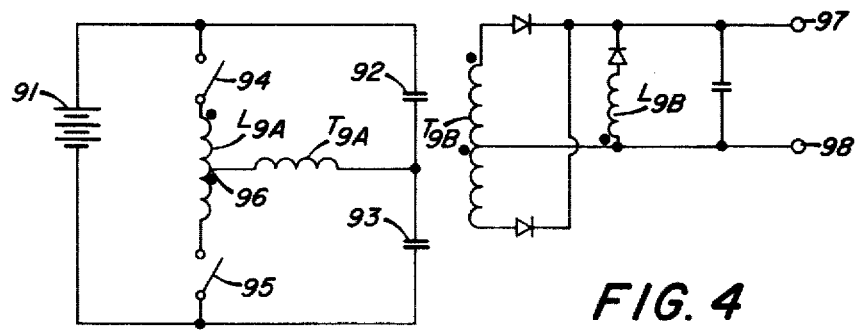
FIG. 4 is a simplified schematic of still another embodiment constructed as a half bridge.

FIGS. 2-4 show variations of power supplies employing the basic principles of this invention. It does not matter what types of elements are used for the switches: they may be SCR's triacs, relays, among others, and they are shown as simple on/off switches in these figures.

A forward inverter is shown in FIG. 2. Input voltage source 71 is connected through inductor $L_{7A}$ to primary winding $T_{7A}$ of transformer $T_7$, that series circuit being controlled by switch 72. The output circuit is coupled to the inverter through secondary winding $T_{7B}$. This winding is connected to output terminals 73 and 74 through diode $D_8$. The secondary winding $T_{7B}$ and diode $D_8$ are connected in parallel with flyback winding $L_{7B}$ and diode $D_9$. This is a simplified schematic and several of the conventional components have been deleted.

A full bridge power supply is shown in FIG. 3 where voltage source 81 is connected to inductor winding $L_{8A}$ which is in turn connected across transformer primary winding $T_{8A}$ through switches 82 and 83. The transformer winding is connected back to voltage source 81 by switches 84 and 85. Capacitor 86 is connected across the voltage source. The output circuit is much the same as that shown in FIG. 2 except that it has a full wave rectified output with secondary winding $T_{8B}$ connected across output terminals 87 and 88 through diodes $D_{10}$ and $D_{11}$. The flyback circuit comprises winding $L_{8B}$ and diode $D_{12}$.

Another embodiment of the invention is shown in FIG. 4 wherein the inverter is configured as a half bridge. Voltage source 91 is connected across one end of transformer primary winding $T_{9A}$ through capacitors 92 and 93, and across the series circuit of inductor winding $L_{9A}$ and switches 94 and 95. The center tap 96 of winding $L_{9A}$ is connected to the end of primary winding $T_{9A}$ opposite from the end connected to the capacitors. The output circuit is substantially the same as that of FIG. 3, with a full wave rectified signal being applied to output terminals 97 and 98.

Values and specific identities of some components will be set forth for example purposes. The main output channel of FIG. 1 may be rated at five volts and 10 amps with the auxiliary channel rated 12 volts at 0.5 amps. In a current fed inverter the main channel secondary winding $T_{1B}$ determines the volts per turn of the transformer. Assuming a two-to-one ratio between primary and secondary, a five volt output and a one volt drop across rectifier diodes $D_1$ and $D_2$ would result in six volts across secondary winding $T_{1B}$. If the secondary is formed with six turns, there will be one volt per turn in the transformer winding. Thus the primary winding $T_{1A}$ would have 12 turns and the voltage thereacross would be 12 volts. If the ratio between primary and auxiliary secondary is 1 to 1.25, the auxiliary input voltage is 15 volts. The previous discussion concerning regulation then easily follows from these values.

The control circuit, IC 37, may be a conventional item sold by Texas Instruments Inc. Under the designation TL494, or equivalent. Voltage regulator 61 is known in the trade as $\mu$A 723 and is so designated by several manufacturers. The diodes will normally be production quantity Schottky diodes without any need for a high peak inverse voltage (PIV) requirement. This is true because the secondary voltage which is applied across diodes such as $D_1$ and $D_2$ remains constant in the current fed inverter of this invention. In the auxiliary channel, transistors $Q_3$ and $Q_4$ are power devices with adequate heat sinking.

The control circuit, IC 37, is shown as a specific device connected in the FIG. 1 circuit in a specific way. However, it should be noted that it is only necessary for operation of the invention that there be means for switching the power transformer primary on and off (pulse width modulation), which switching is related to the output requirements of an output channel. Such means may be as simple or as sophisticated as desired, but the only requirements are that the pulse width modulation means be coupled between the output and the inverter switching means.

Under typical component failure conditions, this power supply will continue to operate without adverse results. A common failure of parallel inverters is when one of the switching transistors ($Q_1$ or $Q_2$) fails open or for a solder connection to open in one side of the inverter circuit. In prior devices, the main transformer would saturate after a few cycles causing excessive current in the functioning transistor resulting in failure of the power supply.

In the circuit of FIG. 1, if an open occurred in the side of the inverter comprising transistor $Q_1$, transistor $Q_2$ would conduct in its normal intermittent manner under control of IC 37, providing energy to be transferred to the output in the forward conducting interval. When $Q_2$ is off, flyback will occur as previously discussed, except that the flyback portion of the cycle would be greatly increased in time. With a heavy load on the output, all of the energy of inductor $L_1$ would be dissipated. The power supply would thus operate at reduced output power, but it would continue to operate and to operate in a safe manner.

Another failure possibility is that one of the output diodes, such as $D_1$ or $D_2$, fails open. In a prior art current fed inverter, the primary inductor would "ring up," that is, rapidly increase voltage in order to attempt to maintain current, causing one of the switching transistors to conduct out of its normal cycle by a high voltage being applied across the collector/emitter junction in a brute force manner. In the FIG. 2 circuit, if diode $D_8$ failed open, there would be an open circuit in the secondary of the main transformer. However, even though there would be no transfer of energy through the main transformer, inductor $L_7$ would continue to supply energy to the output in the flyback mode. By operating in this manner, the inductor would not reverse voltage and overvoltage the transistors to maintain current flow.

In light of this disclosure it is likely that modifications and improvements will occur to those skilled in the art which are within the scope of this invention.

What is claimed is:

1. A power supply comprising: an inverter input circuit comprising: a power transformer primary winding; a source of DC voltage; means for switching said transformer primary winding on and off by intermittently connecting and disconnecting said source thereto; an inductor primary winding connected between said source and said transformer primary in such a manner to make said input circuit a current fed inverter; a first output circuit comprising: a first secondary winding of said power transformer; means for rectifying the output of said power transformer secondary winding; first output terminals; first means for connecting the rectified output of said power transformer secondary winding to said output terminals; and a first flyback circuit connected to said first connecting means, said flyback circuit comprising a first secondary winding of said inductor; and means coupled between said output terminals and said switching means to provide pulse width modulation to said power transformer; and a second output circuit comprising: a second secondary winding of said power transformer; means for rectifying the output of said second power transformer secondary winding; second output terminals; second means for connecting the rectified output of said second power transformer secondary winding to said second output terminals; and a second flyback circuit connected to said second connecting means, said second flyback circuit comprising a second secondary winding of said inductor, whereby regulation of output from said second output circuit is promoted even when said first output circuit is lightly loaded.

2. A power supply comprising: an inverter input circuit comprising: a power transformer primary winding; a source of DC voltage; means for switching said transformer primary winding on and off by intermittently connecting and disconnecting said source thereto; and inductor primary winding connected between said source and said transformer primary in such a manner to make said input circuit a current fed inverter; a first output circuit comprising: a first secondary winding of said power transformer; means for rectifying the output of said power transformer secondary winding; first output terminals; first means for connecting the rectified output of said power transformer secondary winding to said output terminals; and a first flyback circuit connected to said first connecting means, said flyback circuit comprising a first secondary winding of said inductor; and means coupled between said output terminals and said switching means to provide pulse width modulation to said power transformer; and a second output circuit comprising: a second secondary winding of said power transformer; means for rectifying the output of said second secondary winding; second output terminals; second means for connecting the rectified output of said second secondary winding to said second output terminals; a second flyback circuit connected to said second connecting means, said second flyback circuit comprising second secondary winding means of said inductor; and voltage regulation means coupled between said second output terminals and said means for rectifying the output of said second secondary winding, to regulate the output supplied to said second output terminals; said voltage regulation means including means to extract increased energy from said second secondary winding means of said inductor when output from said second secondary winding of said power transformer is reduced as the result of modulation of said power transformer by said switching means under conditions of light loading of said first output circuit.

3. A power supply comprising: an inverter input circuit comprising: a power transformer primary winding; a source of DC voltage; means for switching said transformer primary winding on and off by intermittently connecting and disconnecting said source thereto; an inductor primary winding connected between said source and said transformer primary in such a manner to make said input circuit a current fed inverter; a main output circuit comprising: a first secondary winding of said power transformer; means for rectifying the output of said first secondary winding; output terminals; first means for connecting the rectified output of said first secondary winding to said output terminals; a first flyback circuit connected to said first connecting means, said first flyback circuit comprising a first secondary winding of said inductor; and means coupled between said output terminals and said switching means to provide pulse width modulation to said power transformer; an auxiliary output circuit comprising a second secondary winding of said power transformer; means for rectifying the output of said second secondary winding; second output terminals; second means for connecting the rectified output of said second secondary winding to said second output terminals; a second flyback circuit connected to said second connecting means, said second flyback circuit comprising a second secondary winding of said inductor; and voltage regulation means coupled between said second output terminals and said means for rectifying the output of said second secondary winding; said second secondary winding being formed with an intermediate tap, one end of said second secondary winding and said intermediate tap being connected to said second connecting means, the other end of said second secondary winding being connected to said voltage regulation means.

* * * * *